United States Patent

Hilgert et al.

[11] Patent Number: 5,386,887
[45] Date of Patent: Feb. 7, 1995

[54] BRAKE-ADJUSTING SYSTEM, ESPECIALLY FOR MOTOR VEHICLES

[75] Inventors: Gunter Hilgert, Wetzlar; Reiner Moritz, Ehringshausen; Armin Perner, Asslar, all of Germany

[73] Assignee: Kuster & Co. GmbH, Ehringshausen, Germany

[21] Appl. No.: 104,768

[22] Filed: Aug. 12, 1993

[30] Foreign Application Priority Data

Aug. 12, 1992 [DE] Germany .............. 4226568
Dec. 9, 1992 [DE] Germany .............. 4241389

[51] Int. Cl.⁶ .................. B60T 11/04; F16C 1/22; G05G 7/02
[52] U.S. Cl. ................ 188/2 D; 74/501.5 R; 74/502.4; 188/196 R; 188/196 B; 188/196 BA
[58] Field of Search ............... 188/196 B, 20, 196 R, 188/196 D, 196 BA, 199, 79.51, 200, 196 V, 204 R, 71.8; 74/501.5 R, 502.3, 502.4, 502.5, 502.6; 192/111 A

[56] References Cited

U.S. PATENT DOCUMENTS

| 2,767,811 | 10/1956 | Browall et al. | 188/196 D |
|---|---|---|---|
| 2,814,210 | 11/1957 | Ford | 74/501.5 R |
| 3,119,470 | 1/1964 | Rauglas | 188/196 B |
| 3,200,912 | 8/1965 | Martin | 188/196 B |
| 3,744,339 | 7/1973 | Martinson | 188/2 D |
| 4,378,713 | 4/1983 | Haskell et al. | 74/501.5 R |
| 4,543,849 | 10/1985 | Yamamoto et al. | 74/501.5 R |
| 4,751,851 | 6/1988 | Deligny et al. | 74/501.5 R |
| 4,753,124 | 6/1988 | Chevance | 74/501.5 R |
| 4,762,017 | 8/1988 | Jaksic | 188/196 R |
| 4,838,109 | 6/1989 | Stewart | 188/2 D |
| 5,086,662 | 2/1992 | Tayon et al. | 188/196 B |

FOREIGN PATENT DOCUMENTS

| 0478725 | 4/1992 | European Pat. Off. |
| 499379 | 6/1930 | Germany . |
| 671006 | 1/1939 | Germany . |
| 3819177 | 1/1989 | Germany . |
| 4109887 | 10/1992 | Germany . |

OTHER PUBLICATIONS

Translations of German references 671,006 and 4,109,887 listed above and of German 499,379.

Primary Examiner—Douglas C. Butler
Attorney, Agent, or Firm—Longacre & White

[57] ABSTRACT

A brake-adjusting system in particular for motor-vehicle handbrakes which allows quick adjustment of the handbrake using two freewheel units of which one is employed for driving-conditions proper. As a result unintended brake adjustment shall be prevented. The housing of the system sub-assembly used to adjust the brake cable is divided longitudinally and all parts relating to operation are displaceable solely in the single operational plane of the freewheel units to actuate or to adjust the brake.

10 Claims, 3 Drawing Sheets

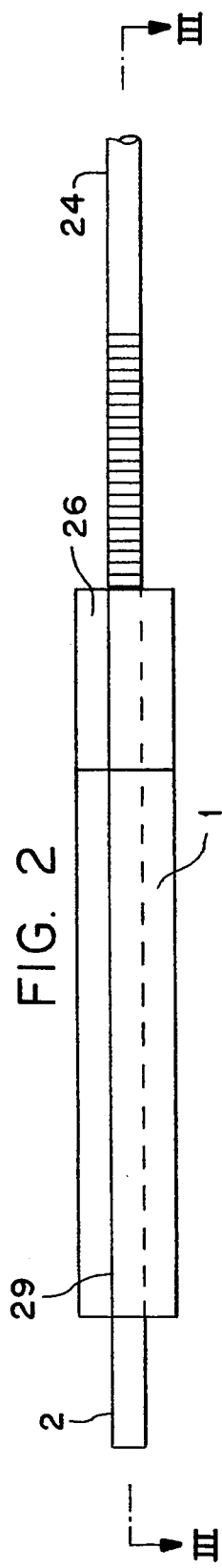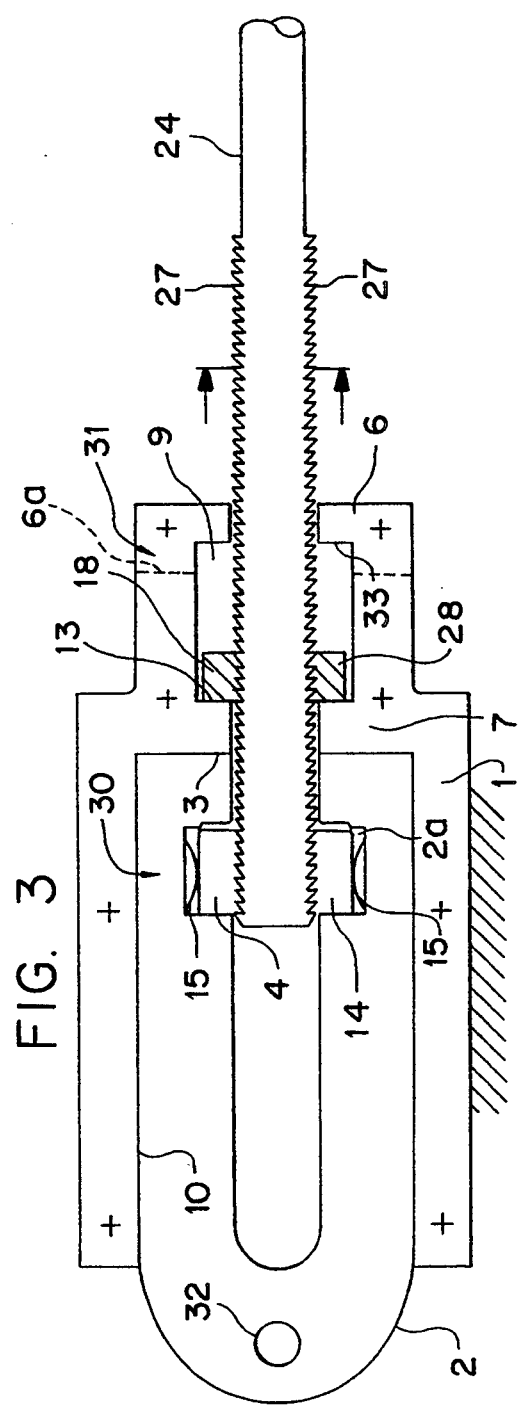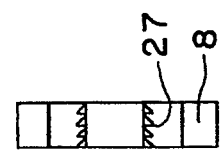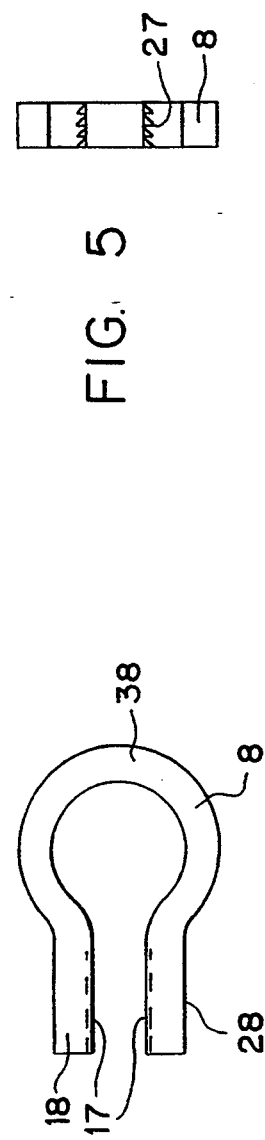

BRAKE-ADJUSTING SYSTEM, ESPECIALLY FOR MOTOR VEHICLES

BACKGROUND OF THE INVENTION a) Field of the Invention

The present invention concerns a brake-adjusting system, in particular for motor-vehicle hand or emergency brakes, comprising a brake lever, an actuating element for the brake, a system sub-assembly to adjust the effective length of the brake cable including two freewheel uniting devices. At least one freewheel uniting device locks in geometric manner the relative position of brake lever to the actuating element under brake tensioning. Further, at least three stops are provided to adjust the path of the actuating element; the freewheel uniting device being mounted between two of the three stops of the said system sub-assembly.

b) Description of Related Art

A similar adjusting system is known from the German Offenlegungsschrift 41 09 887 wherein two pawl mechanisms oriented in the same direction and mounted in a common and essentially cylindrical housing are used as the freewheel unit device. A double stop in the form of a housing wall enclosing a drawbar is present between the two freewheel units and provides a rest for clamping parts of both freewheel units alternatingly resting on it at opposite sides. A further stop limits the second final position, determined by the needs of the braking system, of the first freewheel unit and forms a sort of pre-chamber in the housing to determine the slack of the brake. The two freewheel units are co-directional, that is, they lock in the same direction. When the brake is actuated, the second freewheel unit will lock by a set of teeth with the driving element, while the clamping part of the first freewheel unit will slip over the actuating element as soon as it has passed through the slack of the pre-chamber and come to rest against the double stop.

The kinetic sequence is reversed when disengaging the brake. The first freewheel unit with its elastically compressed clamping part passes through the pre-chamber until coming to rest against the opposite stop and at the latest will lock there with the actuating element in the form of a drawbar and shall prevent further displacement of the actuating element. Further displacement of the brake lever causes the clamping part of the second freewheel unit to slip on the actuating element. Thereby the effective length of the brake linkage or brake cable is shortened by the excess play or the excess of slack. The desired amount of slack is set by the play of the first freewheel unit in the pre-chamber. Preferably this design is applied to motor-vehicle handbrakes.

The known design offers the advantage of also allowing automatically adjusting the brake when it is actuated, however this automatic adjustment entails some dangers. When adjusting, no means is provided to check whether the extent of permissible adjustment already was exceeded. Another drawback is that when overloading the brake by the handbrake, insufficient slack might be set and that when the brake return-spring fails, the required amount of slack also may be lost. Lastly the cylindrical housing for quick-adjustment may be too large to be accommodated in every drive shaft housing. Furthermore an adjusting system for railroad-car brakes operating on similar principles already is known from the German patent 671,006.

SUMMARY OF THE INVENTION

Accordingly it is the object of the present invention to provide a brake-adjusting system averting unintended brake adjustment while nevertheless making possible quick adjustment when installing the brake assembly or during servicing. In addition, the system sub-assembly shall be of minimal height for purposes of quick adjustment to meet the spatial particulars of a motor vehicle.

For the instant invention, the adjustment of the effective length of the brake linkage or cable can be carried out in minimal time in the system sub-assembly and as simply as possible, whereas unintended brake adjustment is precluded by the functional performance of the first freewheel unit during a proper operation of the handbrake. At least one of the locking elements of the first freewheel unit shall be removed again both following the initial brake installation and after correction of the brake setting in the course of shop customer service. The lock(s) of the first freewheel unit is (are) used only as a special tool during shop installation.

In a first embodiment mode of the invention, at least one locking element and the actuating element will be linked in geometrically or frictionally locking manner. For safety, the second and permanently installed freewheel unit is always fitted with a geometric link between the actuating element and the brake lever. The first freewheel unit however also preferably shall comprise a plurality of barbs preventing the freewheel unit from slipping when in the locked position. Illustratively, serrated indents may be provided both at the actuating element and at the locking element to offer maximum safety against unintended disengagement.

In a further embodiment, one or more freewheel units comprise each two parallel locking elements mounted on opposite sides of the actuating element. The locking elements preferably shall extend parallel to each other. This feature offers the advantage, in particular with respect to the disassembled freewheel unit, that both locks can be inserted or withdrawn in a single grip-action. This latter feature is implemented in especially simple manner by a common grip for both locking elements of one pair, whereby erroneous assembly or disassembly of only one locking element is prevented.

Moreover, the invention allows spacing the two locking elements of the freewheel unit to be disassembled in such manner that, on account of the two locking elements being connected by the common grip, they can be slipped in the clamped state onto the actuating element and be held on this actuating element. The grip is a retainer spring. The slipped-on pair of locking elements is clamped onto the actuating element.

To reduce the height of the system sub-assembly adjusting the effective length of the brake drive, the pairwise mounted locking elements of the freewheel units are designed in such manner that they shall be located only on two sides of the actuating element which they shall not enclose. Moreover the locking elements of either or both freewheel units are operational, i.e. mounted in the same longitudinal plane of the system sub-assembly forming the operating plane, in such a way that the housing of this system sub-assembly shall be flat.

In addition, the housing of the system sub-assembly is divided longitudinally for purposes of quick adjustment, and thereby immediate accessibility of all adjusting components is possible following removal of a cover sealing the housing. The interface of the housing parts is parallel to the operational plane.

The design of the invention makes it possible to insert and withdraw the locking elements orthogonally to the functional plane without the need for additional mounting work. Specifically, the stops surround the actuating element on at least two sides and are guide it. Further, the pre-chamber receiving the freewheel unit is accessible transversely to the operational plane and can be fitted in this direction with at least one locking element.

Instead of a disassemblable freewheel unit and in the case of overload, the adjustment operation also can be prevented by the stop of one freewheel unit on the side of the brake lever which is removable or re-assemblable.

Further goals, features, advantages and applications of the present invention are elucidated in the description below of an illustrative embodiment and the drawings. All described and/or graphically shown features are objects of the present invention, whether considered singly or in arbitrary, meaningful combinations, and this even regardless of their summarization in the claims or by reference to latter.

BRIEF DESCRIPTION OF THE DRAWINGS

FIG. 2 is a side view of an adjusting system of the invention with two freewheel units, FIG. 3 is a top view of the adjusting system of FIG. 2 taken along cross section line III-III, FIG. 4 is a side view of the two locking elements of the disassembled freewheel unit of FIG. 2, FIG. 5 is a side view of the locking elements of FIG. 4.

DESCRIPTION OF THE PREFERRED EMBODIMENT

Figure 1:
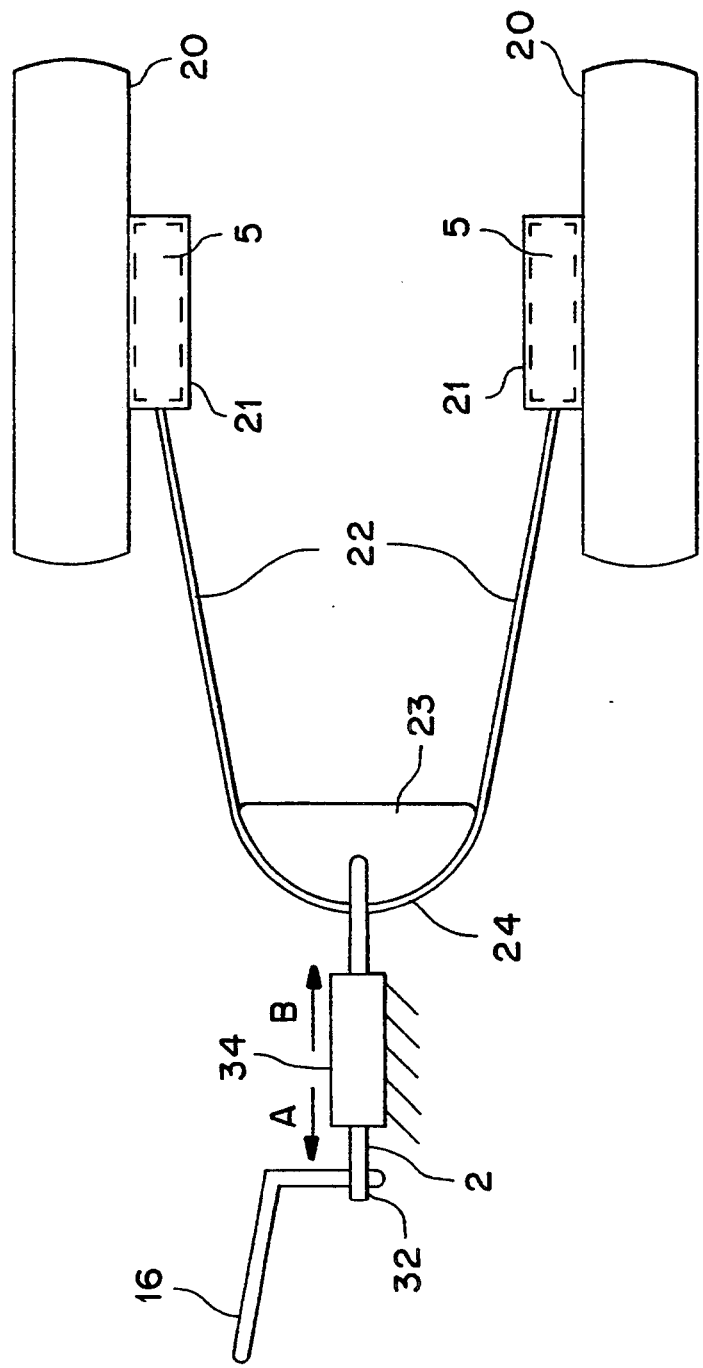
FIG. 1 is a top view of a brake assembly with the adjusting system of the invention.

FIG. 1 shows a brake assembly with two brake drums 21 mounted on two wheels 20 as part of two brakes 5 powered by a cable 22. The cable 22 is passes round a deflecting component 23. An actuating element 24 in the form of a drawbar acts on said deflecting component 23 and at one end enters the system sub-assembly 34 to adjust the effective length of the brake cable 22. A brake lever 16 engages the other end of the system sub-assembly 34 and actuates the brake 5 when the vehicle is moving or when the vehicle is parked. The brake lever 16 and a slider 2 are rigidly joined to each other to the extent that the brake lever 16 can apply a reciprocating motion to the slider 2. When the brake 5 is actuated, i.e. when it is being pulled, the actuating element 24 will move in the direction of arrow A. When the brake 5 is released, omitted springs located in the brake 5 pull the cable 22 and the actuating element 24 back in the direction of arrow B.

FIGS. 2 and 3 show the system sub-assembly 34 for adjusting the effective length of the brake cable 22 with a housing 1 sealed by a cover 26. The housing is affixed to the chassis of a motor vehicle. The cover 26 and the housing 1 subtend an interface 29 extending parallel to the arrows A and B of FIG. 1. This interface 29, which corresponds to the plane of the FIG. 3 also is the operational plane of the system sub-assembly 34 to adjust the effect length of the brake cable. All displacements to adjust the effective length of the cable 22 take place in the plane of FIG. 3.

Inside a guide 10, the housing 1 receives the transmission element 2 designed as a sliding U. The actuating element 24 also is displaceably supported in the housing 1. Accordingly, the length of the brake cable is determined by the resulting length of the cable 22, of the actuating element 24 and of the slider 2.

Two partitions 6, 7 acting as stops are present in the housing 1 with partition 7 separating two freewheel units 30, 31 and acting as a double stop 3, 13. Both partitions 6 and 7 subtend a pre-chamber 9 serving as longitudinal stops 13, 33 to the freewheel unit 31. This first freewheel unit 31 is installed merely when setting the effective brake cable length. The second freewheel unit 30 on the other hand geometrically links the slider 2 and the actuating element 24 during the entire operation of the vehicle. The slider 2 articulates with the handbrake lever 16 by means of the eye 32.

When the cover 26 is removed, all parts can be installed individually in the housing 1. In principle however the system sub-assembly 34 can also operate without the cover 26. The cover 26 can be removed for inspection, for instance to check operation of the system sub-assembly 34 relative to the brake-cable setting or to readjust it.

As shown by FIG. 5, the actuating element 24 is cross-sectionally rectangular and comprises on each opposite cross-sectional side a serration 27 engaged with the serrations 17 of the clamping parts 4, 14 and of the locking elements 18, 28. The slanted teeth of these serrations 17 point in the direction of the arrow B as shown in FIG. 1. The attitude of the teeth allows slippage, in the manner of a ratchet, of the clamping parts 4, 14 and the locking elements 18, 28 discussed further below over the actuating element 24 in the direction of the arrow B and make possible locking action in the direction of the arrow A shown in FIG. 1.

The first freewheel unit 31 consists of two parallel locking elements 18, 28 joined to each other by an annular grip 38. The grip 38 at the same time serves as a spring clamping the two locking elements 18, 28 crossing the actuating element 24 in the assembled state onto this actuating element 24. Together with the grip 38, the locking elements 18, 28 form a ratchet clip 8 as shown in particular detail in FIGS. 4 and 5.

The second freewheel unit 30 comprises two clamping parts 4, 14 also engaging the serration 27 of the actuating element 24 whereby the slider 2 is connected to the actuating element 24. For that purpose the free ends of the legs of the U-slider 2 each comprise a laterally open channel 2a into which leaf springs 15 force the clamping parts 4, 14 against the serration 27 of the actuating element 24 so as to engage said parts 4, 14.

Figure 6:
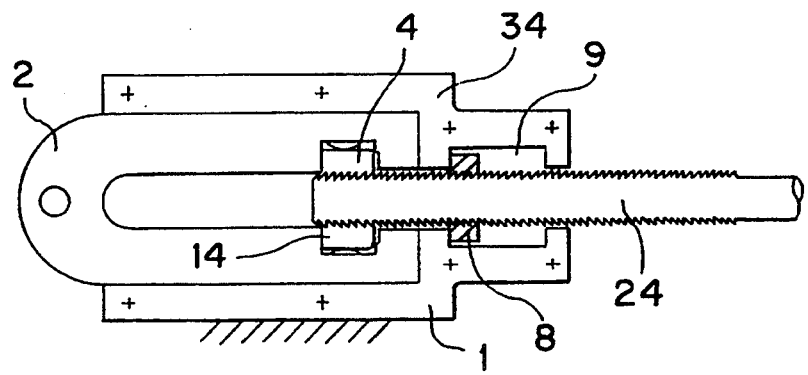
FIG. 6 is a first setting phase of the adjusting system.
Figure 7:
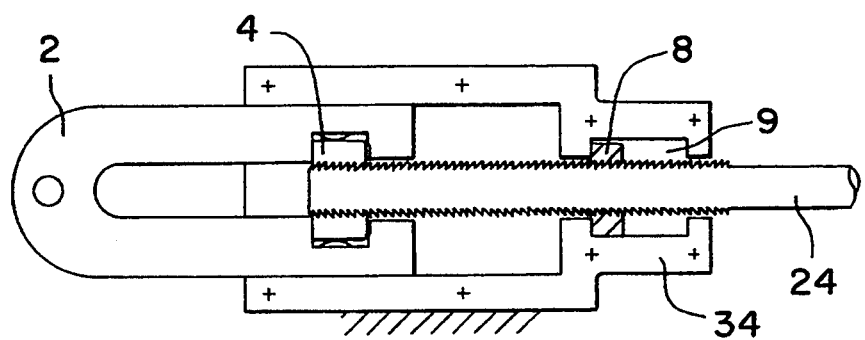
FIG. 7 is a second setting phase of the adjusting system.
Figure 8:
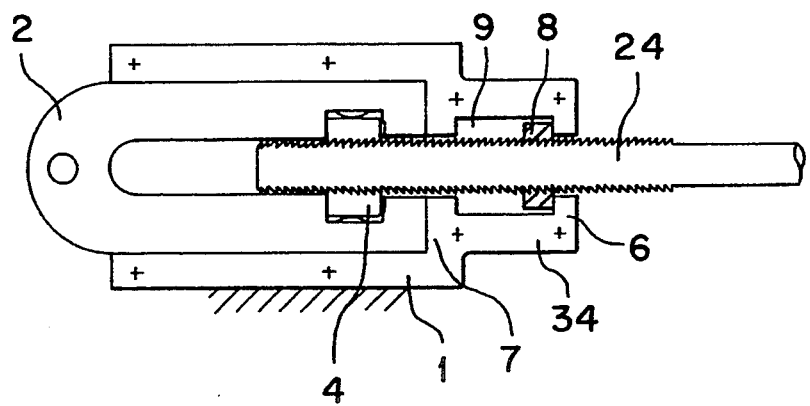
FIG. 8 is a third setting phase of the adjusting system.

The quick adjustment of a handbrake cable carried out with the system of the invention is shown in its particular steps in FIGS. 6, 7 and 8. FIG. 6 shows the initial state of the quick-adjusting system of motor-vehicle brake cables as they are supplied to the automotive manufacturer for assembly-line installation.

To carry out the original adjustment of the brake cable, the slider 2 is pulled by the hand lever 16 into its brake position until a predetermined rated force has been reached. When the handbrake lever 16 is then released, the actuating element 24 together with the slider 2 migrates back only by the path predetermined by the length of the pre-chamber 9 less the thickness of the locking elements 18, 28. Upon stopping against the outer housing wall 6, the ratchet clip 8 locks the drawbar 24. As the brake lever 16 is further moved back, the slider 2 presses the clamping elements 4, 14 of the freewheel unit 30 against the force of the springs 15 whereby said elements 4, 14 leave their snap-in position and move over the actuating element 24 until the slider 2 reaches the housing wall 7 serving as a stop between the two freewheel units 30, 31. Thereupon the ratchet clip 8 is removed and the brake 5 has been adjusted.

Obviously, adjustment of the brake cable 22 also can be carried out in a motor-vehicle shop by inserting and subsequently removing the ratchet clip 8 as shown by the procedure of FIGS. 6, 7 and 8.

Again, the system of the invention may be made comparatively narrow as shown in particular by FIG. 3. For that purpose all movable parts provided to actuate the brake 5 inside the system sub-assembly 34 are solely displaceable in the operational plane defined by FIG. 2. Instead of disassemblable locking elements 18, 28 of the one freewheel unit 31, re-setting the adjusting system in case of overload also can be prevented in that the stop 33 of the first freewheel unit 31 and located on the side of the brake lever shall be removable or that following installation it can be broken off at the assembly line or be provided with a rated rupture site 6a which upon being overloaded allows breaking off the stop 33.

Parts List
1-housing
2-slider
3-double stop
4-clamping part
5-brake
6-housing partition
7-housing partition
8-ratchet clip
9-pre-chamber
10-guide
13-double stop
14-clamping part
15-leaf spring
16-brake lever
17-serration
18-locking element
20-wheel
21-brake drum
22-brake cable
23-deflecting part
24-actuating element, drawbar
26-cover
27-serration
28-locking element
29-interface
30-freewheel unit
31-freewheel unit
32-eye
33-stop
34-system sub-assembly
38-grip While the invention has been particularly shown and described with reference to a preferred embodiment, it will be understood by those having ordinary skill in the art that various changes in form and detail may be made therein without departing from the spirit and scope of the invention,

We claim:

1. An adjusting system for a braking mechanism connected to an emergency brake on a motor vehicle, the braking mechanism including a brake lever, an actuating element for the emergency brake, and the adjusting system for adjusting an effective length of a brake cable extending between the actuating element and the brake, said adjusting system comprising first and second freewheel units, said second freewheel unit located between and locking the relative position of the brake lever with respect to the actuating element while tensioning the brake cable, and at least three stops to adjust a position of the actuating element, said first freewheel unit being mounted between two of the three stops of the adjusting system, wherein said first freewheel unit mounted between the two stops comprises at least one insertable locking element, said locking element being inserted to enable a brake adjustment operation and removed to disable said brake adjustment operation.

2. The adjusting system defined in claim 1, wherein said at least one locking element and the actuating element are connected in geometrically locking manner.

3. The adjusting system defined in claim 1, wherein the first freewheel unit mounted between the two stops comprises two parallel locking elements which are located on opposite sides of the actuating element.

4. The adjusting system defined in claim 3, wherein the two locking elements are connected by a common grip.

5. The adjusting system defined in claim 1, wherein said at least one locking element is forked and in an assembled position clamps the actuating element.

6. The adjusting system defined in claim 1, wherein the at least one locking element of the first freewheel unit and a clamping element of the second freewheel unit affixed in a housing of the adjusting system are mounted in a common longitudinal plane with the actuating element.

7. The adjusting system defined in claim 1, wherein a housing of the adjusting system is divided longitudinally along an operational plane.

8. The adjusting system defined in claim 7, wherein said at least three stops comprise apertures receiving and guiding the actuating element; and a pre-chamber receiving one of said first and second freewheel units is accessible transversely to the operational plane for fitting with at least one locking element.

9. The adjusting system defined in claim 1, wherein said at least one locking element and the actuating element are connected in frictionally locking manner.

10. An adjusting system for a braking mechanism connected to an emergency brake on a motor vehicle, the braking mechanism including a brake lever, an actuating element for the emergency brake, and the adjusting system for adjusting an effective length of a brake cable extending between the actuating element and the emergency brake, said adjusting system comprising first and second freewheel units, said second freewheel unit locking the relative position between the brake lever and the actuating element by means of a geometric link so as to tension said brake cable, said adjusting system further including at least three stops to adjust a position of the actuating element, said first freewheel unit being mounted between two of the three stops of the adjusting system, wherein one of the two stops which is not interposed between said first and second freewheel units is removable and replaceable with respect to said adjusting system, said one of the two stops being mounted on said adjustment system to enable a brake adjustment operation and removed to disable said brake adjustment operation.

* * * * *